Sept. 11, 1956 R. E. STANTON 2,762,420
HEAT SEALING
Filed Jan. 28, 1953
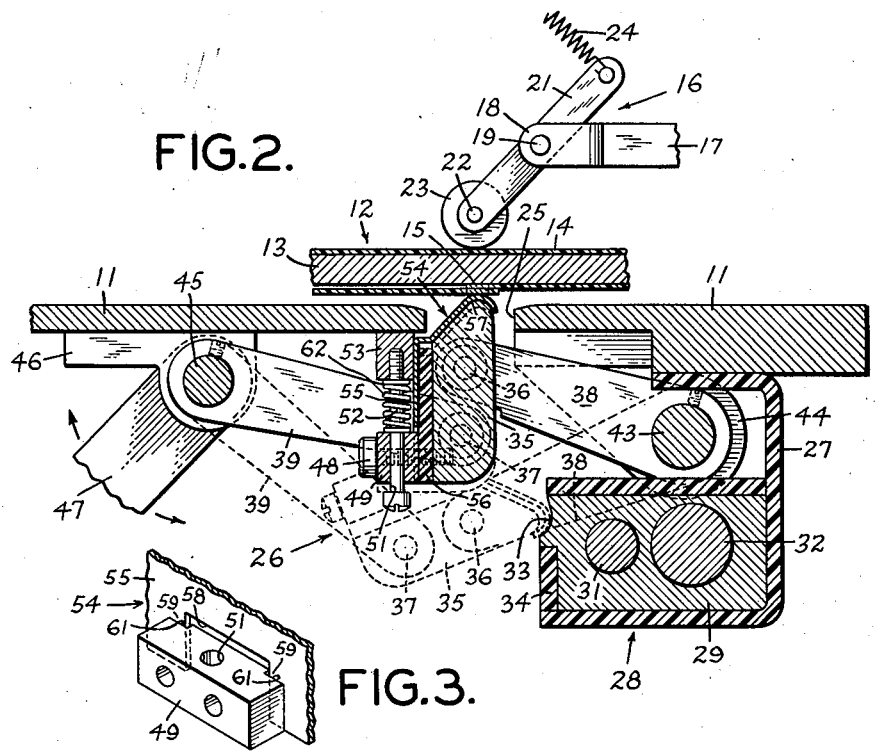
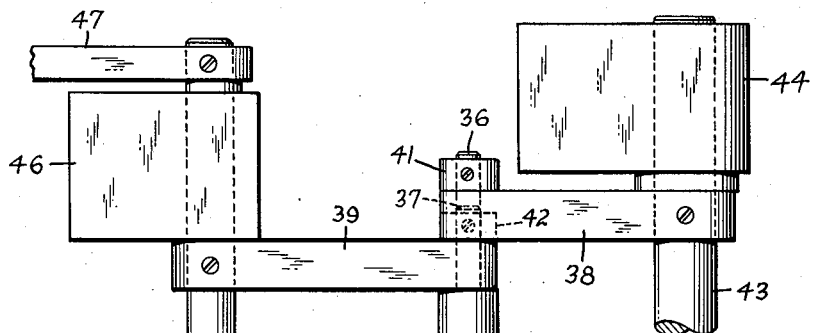
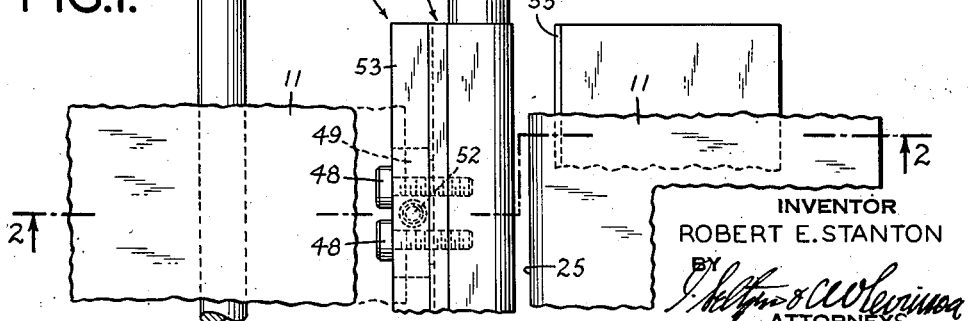
INVENTOR
ROBERT E. STANTON
ATTORNEYS.

United States Patent Office 2,762,420
Patented Sept. 11, 1956

2,762,420

HEAT SEALING

Robert E. Stanton, Bloomfield, N. J., assignor to Celanese Corporation of America, New York, N. Y., a corporation of Delaware Application January 28, 1953, Serial No. 333,728

18 Claims. (Cl. 154—42)

This invention relates to heat sealing and relates more particularly to an improved process and apparatus for the heat sealing of relatively thin films.

The heat sealing of relatively thin films, comprising a thermoplastic material such as cellulose acetate or other organic acid ester of cellulose, to one another presents a number of difficulties. In order to obtain an adequate seal between the films it is necessary to heat the same to an elevated temperature to soften the thermoplastic material; and to apply sufficient pressure to the heated films to produce an autogenous bond therebetween. At the elevated temperatures necessary to produce the bond, it is found that the thermoplastic material tends to adhere to the heating elements and to the pressure applying elements. As a result, when an attempt is made to separate the said elements from the films, distortion and tearing of the films may occur.

It is an important object of this invention to provide a process and apparatus for the heat sealing of relatively thin films to one another which will be free from the foregoing and other disadvantages and which will be efficient in operation and relatively simple in construction.

A further object of this invention is to provide a process and apparatus for the heat sealing of relatively thin films to one another which will keep the distortion and tearing of the said films to a minimum.

Other objects of this invention will be apparent from the following detailed description and claims.

According to the present invention, there is provided a heat sealing apparatus comprising a metallic or other sealing member having a good thermal conductivity and a relatively low thermal capacity. By the use of a suitable heating element, the sealing member is heated to the desired sealing temperature at a position removed from the films to be sealed and is then moved away from said heating element and into contact with the films it is desired to seal. The sealing member brings the films to a plastic state and simultaneously applies sufficient pressure thereto to form an autogenous bond therebetween. There is then brought into contact with the sealing member, a cooling element which may comprise a metallic or other block of good thermal conductivity and relatively high thermal capacity, which cooling element is at a temperature well below the sealing temperature. The cooling element abstracts heat from the sealing member and rapidly reduces the temperature of said sealing member, and the films in contact therewith, to a level well below the sealing temperature. The sealing member is then removed from contact with the sealed films, which removal may be effected without distorting or tearing the films since they are at a sufficiently low temperature to exhibit a high strength and little or no tendency to adhere to the sealing element.

In one form of this invention, the sealing member comprises a thin metallic strip which is fastened to a cooling element comprising a relatively heavy metallic block. The metallic strip is fastened to the block so as to permit relative movement between the two and is normally urged to a position wherein the portion thereof that will contact the films is spaced from the block by any suitable means such as a spring. The entire assembly is mounted on a pair of rocker arms which in one position will bring the sealing member into contact with a heating element to raise said member to the desired sealing temperature. In this position, the cooling element is spaced from the sealing member so that there will be relatively little transfer of heat from the heating element or the sealing member to the cooling element and said element will remain at a temperature well below the sealing temperature. By operating the rocker arms, the sealing member will be moved away from the heating element into contact with the films and will heat the said films to the sealing temperature. Further movement of the rocker arms will bring the cooling element into contact with the sealing member, compressing the spring which normally holds the two apart, and effecting a cooling of said member and also the films in contact therewith. Because of the relatively low thermal capacity of the sealing member said cooling will be effected rapidly. Conversely, because of the relatively high thermal capacity of the cooling element there will be relatively little change in the temperature of said element during the cooling and its temperature will remain well below the sealing temperature. Moreover, because the cooling element will lose heat to its surroundings, it will normally remain at a temperature well below the sealing temperature at all times. However, if desired, the cooling element may be cooled artificially as, for example, by passing a heat transfer medium therethrough at a low temperature.

After the cooling element has been brought into contact with the sealing member to cool the same and also the films in contact therewith, the rocker arms are operated again to separate the sealing member from the films. Since the sealing member and the films are now at a reduced temperature there is little or no tendency for any distortion or tearing of the films to take place during such operation. The movement of the rocker arms may be adjusted, in conventional manner, to give a dwell of desired length at any point in the process, as, for example, during the sealing, to permit a strong seal to be obtained.

During the sealing operation, the material to be sealed may be supported on a table toward which the sealing member is moved to contact the films, or on a table having an aperture therein through which the sealing member is moved to contact the films. In the latter case, suitable pressure means may be provided for urging said material toward said table to hold the material against the table during the sealing operation.

While the process and apparatus of this invention are applicable generally to the heat sealing of films, they are particularly useful in the heat sealing of films comprising a thermoplastic substance such as cellulose acetate or other organic acid ester of cellulose.

A preferred embodiment of this invention is shown in the accompanying drawing wherein:

Fig. 1 is a fragmentary plan view of one end of the sealer, with certain parts broken away in the interests of clarity, Fig. 2 is a cross-sectional view taken on the line 2—2 in Fig. 1, in the direction of the arrows, and Fig. 3 is a detail perspective view of one portion of the sealer.

Like reference numerals indicate like parts throughout the several views of the drawing.

Referring now to the drawing, the reference numeral 11 designates a supporting table adapted to carry a package, indicated generally by reference numeral 12, comprising an article 13 enclosed in a wrapping material 14 which is overlapped, as at 15. The package 12 is urged against the table 11 by means of a pressure assembly, indicated generally by reference numeral 16, comprising a supporting arm 17, fixed to a suitable support, not shown, having a bifurcated end 18 in which is pivotally mounted, by means of a pin 19, an arm 21. At its lower end, the arm 21 has rotatably secured thereto, by means of a pin 22, a pressure roll 23 which bears against the package 12. The roll 23 is urged against the package 12 by means of a spring 24, one end of which is secured to the upper end of the arm 21 and the other end of which is secured to any suitable means, not shown, whereby the spring 24 is placed under tension and tends to rotate the arm 21 in a counter-clockwise direction as viewed in Fig. 2 of the drawing.

The supporting table 11 is provided with an opening 25 extending therethrough and the package 12 is placed on said table in such a manner that the overlap 15 lies over said opening. Positioned beneath the supporting table 11 is a heat sealing assembly, indicated generally by reference numeral 26, comprising a bracket 27 carrying a heating element, indicated generally by reference numeral 28. The heating element 28 comprises a metallic block 29 having embedded therein a heating unit 31 and a thermostat 32 by means of which the block 29 may be heated to the desired sealing temperature. The block 29 is provided, at one corner, with an arcuate depression 33 whose function will be described more fully hereinafter. The upper and side surfaces of the block 29 are covered with layers of thermal insulation 34 and the bracket 27 is advantageously fabricated of thermal insulating material to avoid an excessive loss of heat from the heating element 28.

The heat sealing assembly 26 also includes a cooling element comprising a metallic block 35 of good conductivity and relatively high thermal capacity that is pivotally secured, by means of pins 36 and 37 that project from the end of said block, to rocker arms 38 and 39, respectively. The other end of the block 35 is supported in like manner by a similar pair of rocker arms, not shown. The rocker arms 38 and 39 are held in place on the pins 36 and 37 by means of collars 41 and 42 secured to the ends of said pins. The rocker arm 38 is fastened to a shaft 43 journalled for oscillation in a bracket 44 that is secured to the undersurface of the table 11; while the rocker arm 39 is similarly fastened to a shaft 45 journaled for oscillation in a bracket 46 that is also secured to the undersurface of the table 11. There is secured to the shaft 45 and arm 47 that is caused to oscillate back and forth by any suitable means, not shown, to cause the shaft 45 to oscillate.

The block 35 has secured thereto, by means of bolts 48, a rectangular fitting 49. There is provided in the fitting 49, an aperture 51 through which a bolt 52 extends into threaded engagement with a rectangular strip 53 to which is secured a metallic sealing member indicated generally by reference numeral 54 of good conductivity and relatively low thermal capacity. Although the block 35 is shown fastened to the sealing member 54 at one point only, it is to be understood that a plurality of such fastenings will normally be provided. The sealing member 54 comprises a plate-like portion 55 that extends along one face of a layer of thermal insulation 56 interposed between the block 35 and the sealing member 54, and a rounded sealing tip 57 that is contoured to fit into the depression 33 of the heating element 28. The upper end of the block 35 is contoured to the same shape as the sealing tip 57. At its lower end, the portion 55 is provided with a cut-out 58 to clear that portion of the fitting 49 that contacts the thermal insulation 56, and said portion 55 fits slidably in channels 59 between the fitting 49 and the thermal insulation 56 formed by edges 61 in the edges of said fitting as shown in Fig. 3 of the drawing. A spring 62 under compression encircles the bolt 52 between the fitting 49 and the strip 53 and normally acts to hold the sealing tip 57 of the sealing member 54 out of contact with the block 35 as shown in dotted lines in Fig. 2 of the drawing.

As the first step in forming a heat seal in the overlap 15 of the wrapping material 14, the arm 47 is operated to move the heat sealing assembly 26 to the position shown in dotted lines in Fig. 2 of the drawing with the sealing tip 57 fitted into the depression 33 in the heating element 28. In this position, the spring 62 will hold the sealing tip 57 out of contact with the block 35 so that, although the sealing tip will be heated to the desired sealing temperature by the heating element 28, relatively little heat will be transmitted to the block 35 and said block will remain at a relatively low temperature. The arm 47 will then be moved to bring the heat sealing assembly 26 to the position shown in full lines in the drawing. As the heating assembly 26 moves into this position, the sealing tip 57 will project through the aperture 25 into contact with the overlap 15 and will heat the wrapping material 14 in said overlap to the sealing temperature to produce the desired seal therein. The continued movement of the arm 47 will then bring the block 35 into contact with the sealing tip 57, compressing the spring 62. Because of the relatively low thermal capacity of the sealing member 54 the temperature of said member, and the wrapping material in contact therewith, will be rapidly reduced by contact with the block 35, which is at a relatively low temperature and has a high thermal capacity. The heat sealing assembly 26 is then moved so as to separate the sealing tip 57 and the package 12 which may be done without tearing or distorting the wrapping material 14 since said material is now at a temperature well below the sealing temperature.

It is to be understood that the foregoing detailed description is given merely by way of illustration and that many variations may be made therein without departing from the spirit of my invention.

Having described my invention what I desire to secure by Letters Patent is:

1. Heat sealing apparatus comprising a sealing member, a heating element for heating the sealing member to the desired sealing temperature, means for moving the sealing member away from the heating element into contact with the material to be sealed, a cooling element, and means for moving the cooling element into contact with the sealing member to reduce the temperature of the sealing member and the sealed material in contact therewith.

2. Heat sealing apparatus comprising a sealing member of good conductivity and relatively low thermal capacity, a heating element for heating the sealing member to the desired sealing temperature, means for moving the sealing member away from the heating element into contact with the material to be sealed, a cooling element of good conductivity and relatively high thermal capacity, and means for moving the cooling element into contact with the sealing member to reduce the temperature of the sealing member and the sealed material in contact therewith.

3. Heat sealing apparatus comprising a sealing member, a heating element for heating the sealing member to the desired sealing temperature, means for moving the sealing member away from the heating element into contact with the material to be sealed, a cooling element fastened to said sealing member for relative movement with respect thereto, means normally maintaining the portion of the sealing member which contacts the material to be sealed out of contact with the cooling element, and means for moving the cooling element into contact with the sealing member to reduce the temperature of the sealing member and the sealed material in contact therewith.

4. Heat sealing apparatus comprising a sealing member, a heating element for heating the sealing member to the desired sealing temperature, a cooling element fastened to said sealing member for relative movement with respect thereto, means normally maintaining the portion of the sealing member which contacts the material to be sealed out of contact with the cooling element, and means operatively connected to the sealing member and the cooling element for moving the sealing member only into contact with the heating element for bringing the sealing member to the desired sealing temperature, for moving the heated sealing member away from the heating element into contact with the material to be sealed and for moving the cooling element into contact with the sealing member to reduce the temperature of the sealing member and the material in contact therewith.

5. Heat sealing apparatus comprising a sealing member, a heating element for heating the sealing member to the desired sealing temperature, a cooling element fastened to said sealing member for relative movement with respect thereto, means normally maintaining the portion of the sealing member which contacts the material to be sealed out of contact with the cooling element, and rocker arms operatively connected to the sealing member and the cooling element for moving the sealing member only into contact with the heating element for bringing the sealing member to the desired sealing temperature, for moving the heated sealing member away from the heating element into contact with the material to be sealed and for moving the cooling element into contact with the sealing member to reduce the temperature of the sealing member and the material in contact therewith.

6. Heat sealing apparatus comprising a sealing member having an arcuate sealing tip for contacting the material to be sealed, a heating element having an arcuate depression therein for receiving the sealing tip and for heating the sealing tip to the desired sealing temperature, a cooling element having an arcuate tip fitting into the sealing tip fastened to said sealing member for relative movement with respect thereto, means normally maintaining the sealing tip out of contact with the cooling element, and rocker arms operatively connected to the sealing member and the cooling element for moving the sealing tip only into contact with the heating element for bringing the sealing tip to the desired sealing temperature, for moving the heated sealing tip away from the heating element into contact with the material to be sealed and for moving the cooling element into contact with the sealing tip to reduce the temperature of the sealing tip and the material in contact therewith.

7. Heat sealing apparatus comprising a sealing member comprising a metallic strip of good conductivity and relatively low thermal capacity, a heating element for heating the sealing member to the desired sealing temperature, a cooling element comprising a metallic block of good conductivity and relatively high thermal capacity fastened to said sealing member for relative movement with respect thereto, means normally maintaining the portion of the sealing member which contacts the material to be sealed out of contact with the cooling element, and rocker arms operatively connected to the sealing member and the cooling element for moving the sealing member only into contact with the heating element for bringing the sealing member to the desired sealing temperature, for moving the heated sealing member away from the heating element into contact with the material to be sealed and for moving the cooling element into contact with the sealing member to reduce the temperature of the sealing member and the material in contact therewith.

8. Heat sealing apparatus comprising a sealing member comprising a metallic strip of good conductivity and relatively low thermal capacity having an arcuate sealing tip for contacting the material to be sealed, a heating element having an arcuate depression therein for receiving the sealing tip and for heating the sealing tip to the desired sealing temperature, a cooling element comprising a metallic block of good conductivity and relatively high thermal capacity having an arcuate tip fitting into the sealing tip fastened to said sealing member for relative movement with respect thereto, means normally maintaining the sealing tip out of contact with the cooling element, and rocker arms operatively connected to the sealing member and the cooling element for moving the sealing tip only into contact with the heating element for bringing the sealing tip to the desired sealing temperature, for moving the heated sealing tip away from the heating element into contact with the material to be sealed and for moving the cooling element into contact with the sealing tip to reduce the temperature of the sealing tip and the material in contact therewith.

9. Heat sealing apparatus comprising a sealing member comprising a metallic strip of good conductivity and relatively low thermal capacity having an arcuate sealing tip for contacting the material to be sealed, a heating element having an arcuate depression therein for receiving the sealing tip and for heating the sealing tip to the desired sealing temperature, a cooling element comprising a metallic block of good conductivity and relatively high thermal capacity having an arcuate tip fitting into the sealing tip fastened to said sealing member for relative movement with respect thereto, springs normally maintaining the sealing tip out of contact with the cooling element, and rocker arms operatively connected to the sealing member and the cooling element for moving the sealing tip only into contact with the heating element for bringing the sealing tip to the desired sealing temperature, for moving the heated sealing tip away from the heating element into contact with the material to be sealed and for moving the cooling element into contact with the sealing tip to reduce the temperature of the sealing tip and the material in contact therewith.

10. Heat sealing apparatus comprising a supporting table for supporting the material to be sealed, a sealing member, a heating element for heating the sealing member to the desired sealing temperature, means for moving the sealing member away from the heating element into contact with the material to be sealed, a cooling element, and means for moving the cooling element into contact with the sealing member to reduce the temperature of the sealing member and the sealed material in contact therewith.

11. Heat sealing apparatus comprising a supporting table having an aperture therethrough for supporting the material to be sealed, pressure means urging the material to be sealed against the table, a sealing member, a heating element for heating the sealing member to the desired sealing temperature, a cooling element fastened to said sealing member for relative movement with respect thereto, means normally maintaining the portion of the sealing member which contacts the material to be sealed out of contact with the cooling element, and means operatively connected to the sealing member and the cooling element for moving the sealing member only into contact with the heating element for bringing the sealing member to the desired sealing temperature, for moving the heated sealing member away from the heating element through the aperture in the table into contact with the material to be sealed and for moving the cooling element into contact with the sealing member to reduce the temperature of the sealing member and the material in contact therewith.

12. Heat sealing apparatus comprising a supporting table having an aperture therethrough for supporting the material to be sealed, pressure means urging the material to be sealed against the table, a sealing member comprising a metallic strip of good conductivity and relatively low thermal capacity having an arcuate sealing tip for contacting the material to be sealed, a heating element having an arcuate depression therein for receiving the sealing tip and for heating the sealing tip to the desired sealing temperature, a cooling element comprising a metallic block of good conductivity and relatively high thermal capacity having an arcuate tip fitting into the sealing tip fastened to said sealing member for relative movement with respect thereto, spring normally maintaining the sealing tip out of contact with the cooling element, and rocker arms operatively connected to the sealing member and the cooling element for moving the sealing tip only into contact with the heating element for bringing the sealing tip to the desired sealing temperature, for moving the heated sealing tip away from the heating element through the aperture in the table into contact with the material to be sealed and for moving the cooling element into contact with the sealing tip to reduce the temperature of the sealing tip and the material in contact therewith.

13. Process for heat sealing thermoplastic sheet material, comprising heating a sealing member to the desired sealing temperature, moving the sealing member away from the source of heat into contact with the material to be sealed to raise the said material to the sealing temperature, and, after an interval, positively cooling said sealing member to lower the temperature thereof while said sealing member is in contact with said material.

14. Process for heat sealing thin films of thermoplastic material, comprising heating a sealing member to the desired sealing temperature, moving the sealing member away from the source of heat into contact with the thin films to raise the same to the sealing temperature, and, after an interval, positively cooling said sealing member to lower the temperature thereof while said sealing member is in contact with said thin films.

15. Process for heat sealing thin films of cellulose acetate, comprising heating a sealing member to the desired sealing temperature, moving the sealing member away from the source of heat into contact with the thin films to raise the same to the sealing temperature, and, after an interval, positively cooling said sealing member to lower the temperature thereof while said sealing member is in contact with said thin films.

16. Process for heat sealing thermoplastic sheet material, comprising heating a sealing member of good conductivity and relatively low thermal capacity to the desired sealing temperature, moving the sealing member away from the source of heat into contact with the material to be sealed to raise the latter to the sealing temperature, and, after an interval, positively cooling said member while the same is still in contact with said material by bringing into contact with said sealing member an element of good conductivity and relatively high thermal capacity.

17. Process for heat sealing thin films of thermoplastic material, comprising heating a sealing member of good conductivity and relatively low thermal capacity to the desired sealing temperature, moving the sealing member away from the source of heat into contact with the thin films to raise the same to the sealing temperature, and, after an interval, positively cooling said member while the same is still in contact with said thin films by bringing into contact with said sealing member an element of good conductivity and relatively high thermal capacity.

18. Process for heat sealing thin films of cellulose acetate, comprising heating a sealing member of good conductivity and relatively low thermal capacity to the desired sealing temperature, moving the sealing member away from the source of heat into contact with the thin films to raise the same to the sealing temperature, and, after an interval, positively cooling said member while the same is still in contact with said thin films by bringing into contact with said sealing member an element of good conductivity and relatively high thermal capacity.

References Cited in the file of this patent

UNITED STATES PATENTS

| Number | Name | Date |
|---|---|---|
| 2,135,763 | Nicholson | Nov. 8, 1938 |
| 2,460,460 | Langer | Feb. 1, 1949 |
| 2,469,972 | Lowry et al. | May 10, 1949 |
| 2,509,439 | Langer | May 30, 1950 |
| 2,542,900 | Chaffee | Feb. 20, 1951 |
| 2,675,054 | Langer | Apr. 13, 1954 |
| 2,697,474 | McGinley | Dec. 21, 1954 |
| 2,725,091 | Miner et al. | Nov. 29, 1955 |